(12) United States Patent
Lambertsen

(10) Patent No.: US 7,079,158 B2
(45) Date of Patent: Jul. 18, 2006

(54) VIRTUAL MAKEOVER SYSTEM AND METHOD

(75) Inventor: Kirsten Lambertsen, San Francisco, CA (US)

(73) Assignee: BeautyRiot.com, Inc., San Francisco, CA (US)

( * ) Notice: Subject to any disclaimer, the term of this patent is extended or adjusted under 35 U.S.C. 154(b) by 0 days.

(21) Appl. No.: 09/939,938

(22) Filed: Aug. 27, 2001

(65) Prior Publication Data

US 2002/0024528 A1    Feb. 28, 2002

Related U.S. Application Data

(60) Provisional application No. 60/229,410, filed on Aug. 31, 2000.

(51) Int. Cl.
*G09G 5/00* (2006.01)
*G09G 5/02* (2006.01)

(52) U.S. Cl. ................. 345/630; 345/646; 345/592

(58) Field of Classification Search ............. 345/592, 345/629, 630; 382/128, 294; 434/257; 132/200
See application file for complete search history.

(56) References Cited

U.S. PATENT DOCUMENTS

| 4,539,585 | A | | 9/1985 | Spackova et al. ............. 358/93 |
|---|---|---|---|---|
| 5,495,338 | A | | 2/1996 | Gouriou et al. ............. 356/402 |
| 5,659,625 | A | * | 8/1997 | Marquardt ................. 382/118 |
| 5,692,117 | A | * | 11/1997 | Berend et al. ............. 345/475 |
| 5,719,951 | A | * | 2/1998 | Shackleton et al. ......... 382/118 |
| 5,805,745 | A | * | 9/1998 | Graf .......................... 382/291 |
| 5,854,850 | A | * | 12/1998 | Linford et al. ............. 382/128 |
| 5,933,527 | A | * | 8/1999 | Ishikawa .................... 382/190 |
| 5,978,507 | A | * | 11/1999 | Shackleton et al. ......... 382/195 |
| 5,990,901 | A | * | 11/1999 | Lawton et al. ............. 345/429 |
| 6,095,650 | A | * | 8/2000 | Gao et al. ................... 351/227 |
| 6,293,284 | B1 | * | 9/2001 | Rigg .......................... 132/200 |
| 2001/0026272 | A1 | * | 10/2001 | Feld et al. .................. 345/419 |
| 2001/0037191 | A1 | * | 11/2001 | Furuta et al. .................. 703/6 |

FOREIGN PATENT DOCUMENTS

| JP | 2000011143 A | * | 1/2000 |
|---|---|---|---|
| JP | 2000011144 A | * | 1/2000 |

* cited by examiner

*Primary Examiner*—Ryan Yang
(74) *Attorney, Agent, or Firm*—Nutter, McClennen & Fish LLP

(57) ABSTRACT

A virtual makeover system and method are disclosed which allows users to apply beauty products to a personal photographic image, thereby creating a digitally enhanced image. The system includes a product catalog, a palette database, and an image database, all of which may be accessed by a user via a communications network or stored on the hard drive of a user's computer. Users can upload digital photographs of themselves or others, or can retrieve an image from the image database, and outline various features in the photograph. The user may apply selected beauty products available in the product catalog to the various features.

12 Claims, 9 Drawing Sheets

VIRTUAL MAKEOVER SYSTEM AND METHOD

CROSS-REFERENCE TO RELATED APPLICATIONS

This application claims priority from U.S. Provisional Patent Application Ser. No. 60/229,410, filed on Aug. 31, 2000, entitled "Virtual Makeover System and Method," which is expressly incorporated by reference herein.

BACKGROUND OF THE INVENTION

The present invention relates to virtual makeover systems, and more particularly to a method and system for a virtual makeover utilizing a communications network and/or an application stored on a computer readable medium, such as a CD-ROM.

Through the use of the Internet, many companies have begun to use virtual visualization applications in attempt to personalize the on-line shopping experience. The goal has been to provide Internet users with a purchasing experience that is as close to reality as possible. The ability of consumers to mix, match, and view different products together over the Internet has significantly enhanced the Internet buying experience.

Beauty product vendors have also begun to use such virtual shopping techniques as well. Users can create a virtual figure to try on clothing, or they can upload a personal photographic image (i.e., a "headshot") to try on beauty products. Makeoverstudio.com, for example, allows users to electronically submit a personal "headshot" photograph over a communications network. The company then notifies the user when the headshot is ready for a makeover, and the user can then enter the web site and select different products to view with the personal image. The user appears to be trying on makeup and other products, but is not doing so. Once the user has selected the desired hairstyle and makeup, the user can determine how to achieve the desired look, and a list of products available for purchase is provided to the user. Although somewhat useful, this system does not allow a user to customize the application of beauty products. Rather, the system predetermines the area and the shape of the area in which the items can be applied. In addition, the user can only apply and view products over an Internet connection.

Users can also purchase software programs that allow the user to evaluate different products, such as Cosmopolitan's Virtual makeover. The program is equipped with a variety of hairstyles, accessories, and cosmetic products that can be virtually evaluated. Users are instructed to upload a personal image or headshot, then align the headshot for application. The alignment process requires the user to select and position preset shapes upon the image until they are generally in-line with the areas of the face. The user may then select wigs, products, and accessories to apply to the personal image. This system also suffers from the drawback that it cannot be customized by the user.

Despite the existence of such virtual makeover systems, there remains a need for an improved method and system for a virtual makeover.

SUMMARY OF THE INVENTION

The present invention relates to a virtual makeover system and method which allows users to apply beauty products to a personal photographic image, thereby creating a digitally enhanced image. The system and method can be used over a communications network, and can also be provided to users as an application, such as a software program. The application can be stored on a computer readable medium, or it can be downloaded via the Internet.

The system of the present invention generally includes a product catalog, a palette database, and an image database, all of which may be accessed by a user via a communications network or stored on the hard drive of a user's computer. The product catalog is maintained by the system or host site and includes a variety of beauty products available for purchase, such as wigs, glasses, contacts, eye shadow, blush, eye liner, lipstick, lip liner, foundation, eyebrow color, hair color, eye lashes, etc. of various styles, brands, and colors. The product catalog may be downloaded to the user's computer for off-line access by the user. The palette database contains pre-configured palettes, which may be created by vendors and service providers, and user-created palettes. A palette is essentially a complete makeover, consisting of a collection of beauty products, which can be "applied" instantly to an image on the computer screen, together with suitable modern graphics instructions implementing the manner, location, and form in which they are to be applied. The image database consists of several digital photographic images provided by the user and/or by the system.

In one aspect of the present invention, users can upload digital photographs of themselves or others. One of ordinary skill in the art will readily appreciate that several different methods and systems exist for uploading and viewing images, and that all known methods and systems can be used with the present invention.

Once a photograph is uploaded or selected, the user then identifies the basic parameters of the head and face in the photograph using adjustable guides. Then, the user selects various features in the photograph and outlines these features. During the outlining step, the user defines the size and shape of a specific feature for which future treatment or manipulation is desired. Preferably, a default shape is provided for each feature which consists of several points connected by lines to form a shape. The user outlines the feature by selecting and moving the one or more points to alter the orientation of connected lines, thus creating a new shape. Once each feature is outlined, the user can save the newly formed shapes in connection with the particular photograph.

In one aspect of the present invention, users can send the photograph with the saved outlined features to other users. The selected features can include, for example, the face shape, which includes the forehead, left side, and right side of the face, the eyes, lips, eye creases, eyebrows, eye highlights, cheeks, and irises. Other features can include the head, eyeliners, eyelids, and eyelashes. Tools are also provided which allow the user to reshape, move, zoom in/out, add/delete points, rotate, or erase the default outlines. The tools are implemented in a manner similar to such tools provided with computer graphics programs, and are implement by moving a pointer, clicking on property or task selection buttons, and the like. A virtual brush with a color palette, and an eyedropper for painting and removing red-eye can also be provided.

Once the user has finished outlining a photograph, the user may then apply selected beauty products from the product catalog to the image thereby creating a digitally enhanced image and participating in a virtual shopping experience. Users can save the digitally enhanced image as a new image. In one embodiment, users can change the opacity and/or thickness of the applied products.

In a further embodiment of the present invention, users can save the selected beauty products applied to an image as a palette. The palettes can be applied to other images, or sent to other users for application. The user-created palettes may be stored in the palette database or on the hard drive of a user's computer.

In yet another embodiment of the present invention, a shopping cart is provided for saving selected products. The "shopping cart" is a tool that allows users to save one or more beauty products of interest to the user. The one or more items placed in the shopping cart may be stored (preferably temporarily) on the user's computer hard drive for subsequent, local use. The user is thus able to engage in an off-line virtual shopping experience. Once a user elects to purchase one or more items, the user can connect to the system to place an order for the desired items in his/her shopping cart. Any items purchased by the user are subsequently removed from the shopping cart. However, users may view prior purchases to place subsequent orders for items previously purchased. Users may add or remove any items from the shopping cart at anytime, and may send a wish list containing the items in the shopping cart to other users.

In a further embodiment of the present invention, users may access the image database to select a pre-set (outlined) image to use for a makeover. While the pre-set image does not require users to outline the features, users may adjust the outline shapes so as to change the shape of the features that are outlined. Users can also apply saved palettes to the pre-set images. In another embodiment, some of the images in the image database have pre-configured palettes stored with the image. Users can apply a pre-configured palette to their own photographic images, or to other user photographic images, and can also place an order for one or all of the items in the palette.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention is directed to a virtual makeover system and method which allows users to apply beauty products to a digital photographic image, thereby creating a digitally enhanced image. Beauty products can be applied to the images as part of a virtual shopping experience and/or for purposes of entertainment and education. More particularly, the present invention provides a method and system for outlining features in a digital photographic image, and subsequently applying beauty products to the outlined features. The system and method can be used over a communications network, and can also be provided to users as an application, such as a software program for use locally on a personal computer system. The application can be stored on a computer readable medium, or it can be downloaded from the Internet. A product database containing a plurality of beauty products available for purchase is provided by the system or the application. The beauty products in the product database are computer manipulable by the user such that specific beauty products can be applied to and displayed in connection with the outlined features of a photographic image. Users can provide their own photographic images, or can obtain an image from an image database. Users can search for, select, and apply different products to the photographic image. The new digitally enhanced image, with the products applied, can be saved as a snapshot image. The applied products can also be saved as a palette in a palette database or on the users' hard drive, and can also be placed into a shopping cart for future use and/or purchase. Users can also electronically exchange outlined photographic images, snapshot images, and saved palettes with other users.

Figure 1:
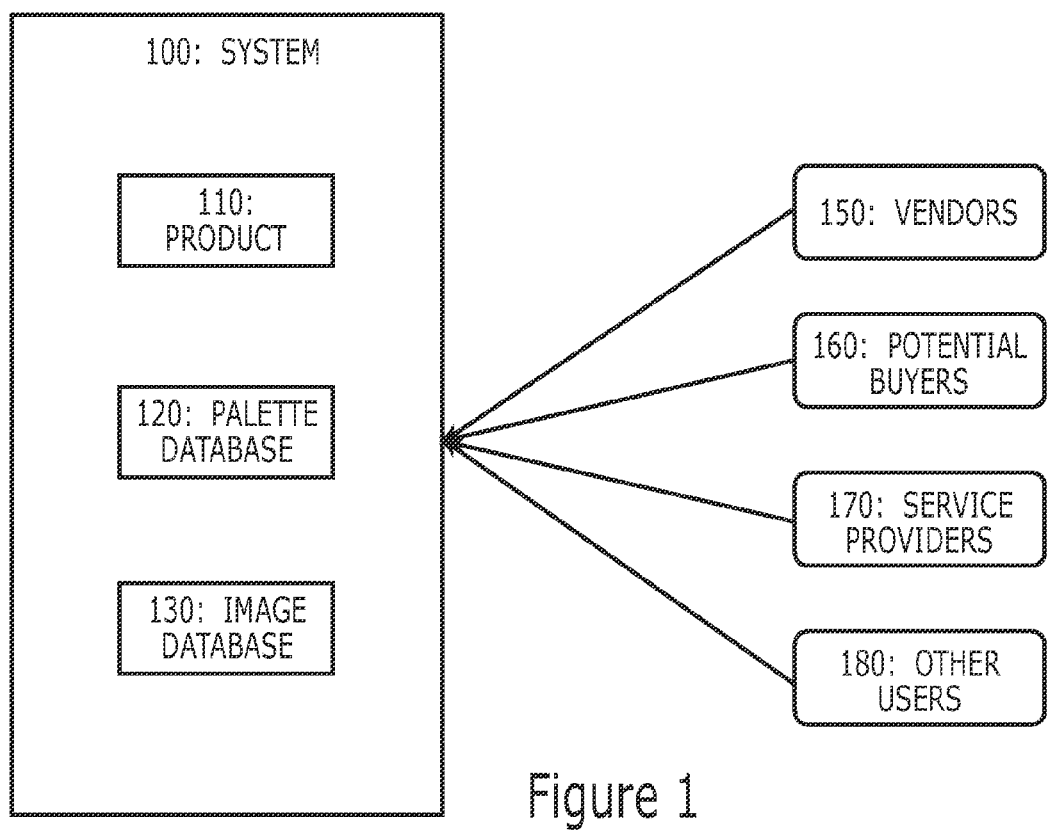
FIG. 1 is a diagram of the general system and the users of the present invention.

FIG. 1 illustrates the general system 100 of the present invention, which includes a product catalog 110, a palette database 120, and an image database 130. The system can be accessed via a communication network, e.g. the Internet, or can be provided to users as an application, such as a software program for use locally on a personal computer system. The application can be stored on a computer readable medium, or it can be downloaded from the Internet. If the system is stored on the hard drive of a user's personal computer system, the user can connect to the host site, such as through an Internet connection, to download any changes or updates to the system 100 itself, as well as to the product catalog 110, palette database 120, and image database 130.

The product catalog 110, which is maintained by the system and is downloadable to a user's hard drive, includes a variety of beauty products offered by different vendors. Beauty products include, for example, wigs, glasses, contacts, eye shadow, blush, eye liner, lipstick, lip liner, foundation, eye brow color, hair color, hair styles, eye lashes, etc. of various styles, brands, and colors.

The palette database 120 contains pre-configured palettes and user-created palettes. A palette consists of a combination of beauty products, which together create an image, or makeover. The pre-configured palettes are created by the system, or can be created by a service provider, e.g., a makeup artist, or vendor.

The image database 130 contains one or more digital photographic images, including pre-set images, pre-configured images, and user-saved images. Pre-set images are already set up for the user and thus do not require the user to outline the features in the image. However, the user may change the shape of any of the outlined features. Pre-configured images are images which have already been made-over. That is, a specific palette has been applied to the image. The user-saved images can include images which are setup and saved by the user, and also digitally enhanced images which have products applied thereto.

The various users that can access the system include vendors 150, potential buyers 160, service providers 170, and other users 180 in general. Vendors 150 may, for example, access the product database to add or remove products offered by the vendor, or to update the product listing. Beauty service providers may access the palette database to create new palettes for customers of the service provider. It is understood that access to the system and its various databases is generally controlled by the system or host site.

Figure 2:
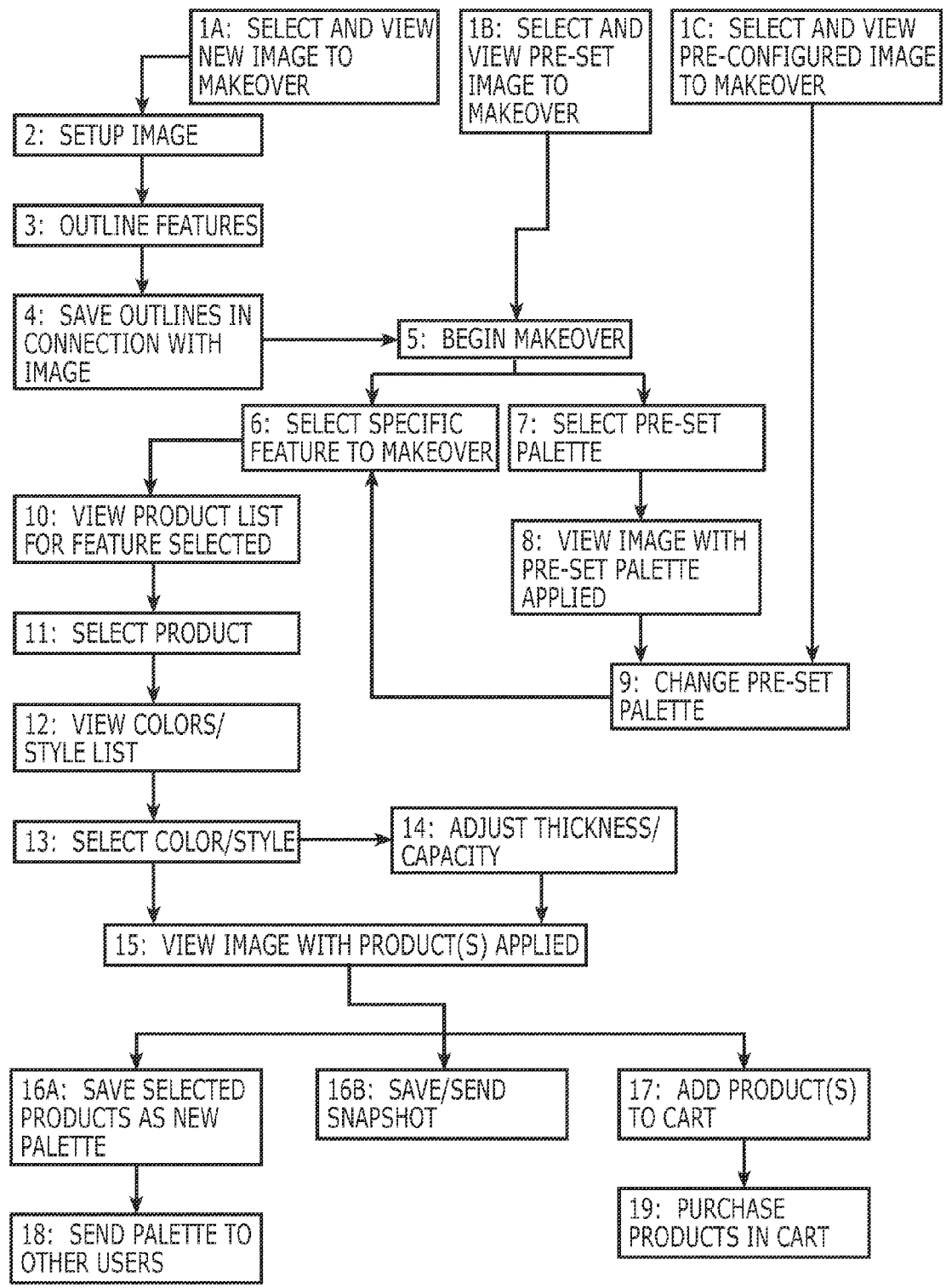
FIG. 2 is a diagram of the general method of the present invention.

The general method of the present invention is illustrated in FIG. 2. A user first selects and views a new photographic image 1A, a pre-set image 1B, or a pre-configured image 1C to makeover. If the user selects a new image 1A to makeover, the user must setup the image 2, which consists of aligning the image, and then outlining selected features 3 in the photograph. The method of aligning the image and outlining the features will be described in more detail below with reference to FIG. 3. Once the user has finished outlining the features, the user may then save the outlines in connection with the image 4 and begin the makeover 5. If the user selects and views a pre-set image 1B, the user may skip the setup step, and directly begin the makeover 5. If a user selects a pre-configured image, which is saved in conjunction with a palette, the image will be displayed to the user with the palette applied to the outlined features in the image. The user may change the palette, adding or removing additional products selected from the product catalog.

In order to begin the makeover 5, the user may either select a pre-configured palette 7 from the palette database stored in the system or application, or the user may select specific features to makeover 6. If the user selects a pre-configured palette 7, a made-up image having the products in the pre-configured palette is applied to features in the photograph 8 and displayed to the user. The user may then make changes to the pre-configured palette 9, or add some or all of the products in the pre-configured palette to the shopping cart 17. If the user elects to make changes to the pre-configured palette, the user begins by selecting a specific feature to makeover 6.

Once a feature is selected 6, a list of available products which can be applied to that feature is shown to the user 10. The user then selects a desired product 11. All colors and styles available for that product are shown to the user 12. The user may then select a color or style 13, and view the image with the product applied to the selected feature 15. The user may also adjust the thickness or opacity of the applied product 14. When the user is finished selecting and applying products to features in the image, the user may save the digitally enhanced image in the image database, and can optionally send 16B the image to other users. The user can also save the selected products as a new palette 16A. The palettes can be applied to other images, or sent 16B to other users for application 18. The makeover process is described in more detail below with reference to FIG. 5.

In one embodiment of the present invention, the user may place one or more items from the product catalog in a shopping cart 17 for storage (preferably temporarily) on the user's computer hard drive for subsequent, local use. The "shopping cart" is a tool that allows users to save, for convenient future access, one or more beauty products of interest to the user. The user is thus able to engage in an off-line virtual shopping experience.

The shopping cart can also be used to facilitate purchases 19 of beauty products. Once the user has identified all beauty products for which purchase is desired, they are preferably placed in the user's shopping cart 17. The user is able to indicate to the system that the user desires to purchase 19 all, or selected, items in the shopping cart. The system will then electronically connect to the host site, via a communications network, and process the user's order and charge the transaction costs to a user credit account provided by the user to the system at the time or ordering, or previously provided to the system by the user. Items placed in the shopping cart, whether or not purchased, may be saved for future use by the user. Users may also remove any items from the shopping cart, send a wish list containing the items in the shopping cart to other users, or save the items in the shopping cart for future use.

In one embodiment, the user may connect to the system, such as through an Internet connection, to download one or more products to the user's shopping cart. Once all desired products are loaded into the shopping cart, the user may disconnect from the Internet or other electronic connection. Despite being disconnected from the system (or host site), the shopping cart, and the products therein, remain on the user's computer (e.g., on the hard drive) and are available for use by the user without an electronic connection to the system. One of ordinary skill in the art will readily appreciate that in order to take full advantage of this feature one should have the appropriate software present on his or her computer, and that such software may be downloaded from the system or otherwise provided by the system, directly or indirectly, to the user.

Figure 3:
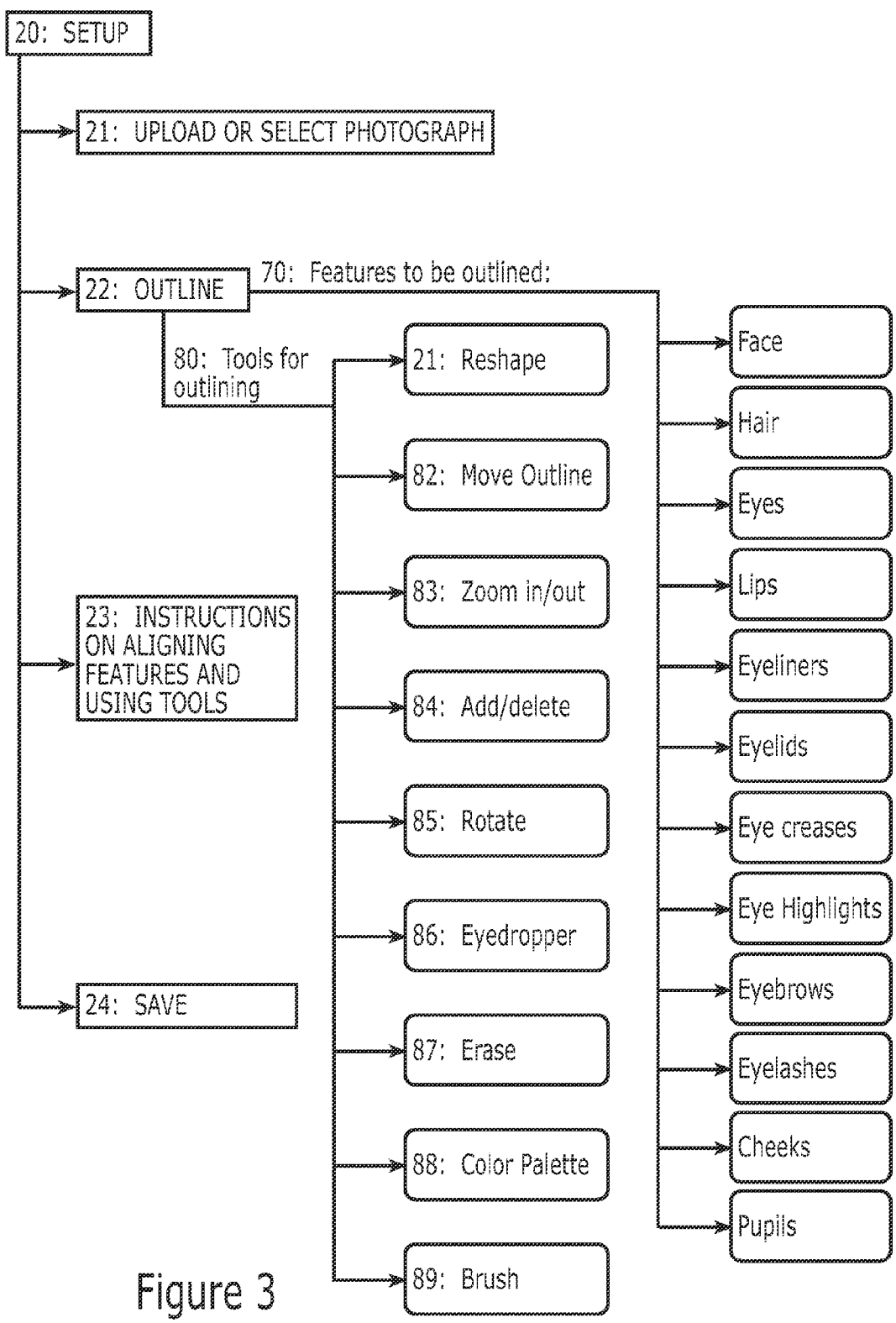
FIG. 3 is a diagram of the general method for setting up a photographic image in accordance with the present invention.

FIG. 3 illustrates the general method for setting up 20 a photograph, which comprises uploading or selecting a photographic image 21, outlining features 22, and saving 24 the outlined features. The system may also include instructions 23 for outlining features and using the outlining tools. One of ordinary skill in the art will readily appreciate that several different methods and systems exist for uploading and viewing images, and that all known methods and systems can be used with the present invention. Typically, the user will provide a JPEG image, a so-called "internet image" made by a simple digital snapshot camera attached to a home computer, or a photo CD (".pcd") image file. The application program for a system of the present invention may operate with any of these, and preferably includes a module which determines image file type and re-sizes the image as appropriate to fit the virtual makeover display screen. This allows the user to employ images from any source, from scanned home snapshots, home digital pictures, and images copied from the Internet. Once a photograph is uploaded, the users may outline 22 the features 70 using the tools for outlining 80. When the selected features 70 are outlined, the user can then instantly apply beauty products to a desired feature without having to draw and/or paint.

The term "features," as used herein, is understood to refer to various, discrete regions of a person's face, or an image of a face, to which one or more beauty products are commonly applied. Each feature generally has a certain shape, and as described below with respect to FIG. 4, certain default shapes are provided. The shape of each feature can be altered, or "outlined" by a user.

Figure 4:
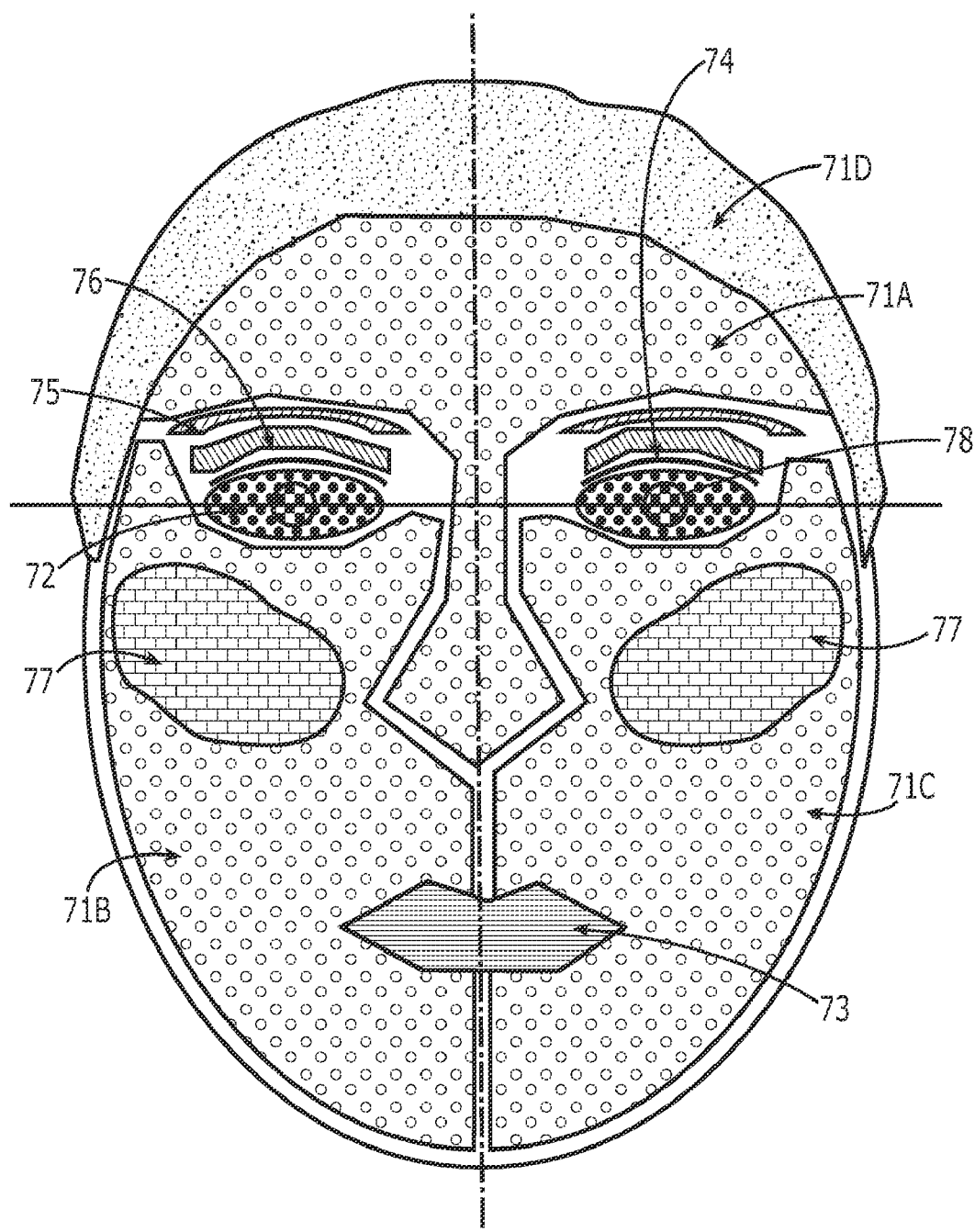
FIG. 4 is a diagram illustrating the default shapes for outlining features in a photographic image in accordance with the present invention.

FIG. 4 shows an exemplary default shape or outline for each feature. The shapes are defined by a series of points 50 connected by lines 52 to form a desired shape. The user can select and move a point 50, thus changing the shape of the outline. Each time a user moves a point 50, the lines 52 connected to the point 50 move with it. The user can adjust all of the points 50 until the feature is outlined in a manner desired. Tools are also provided for adjusting the size and location of the shapes. Once all of the desired features are outlined by the user, the user can save the outlined features in connection with the photographic image for future use.

With reference to FIG. 4, the default shapes are shown for various facial features. Features include the face shape 71, which includes the forehead 71A, the right side 71B, and the left side 71C of the face, the hair 71D, eyes 72, lips 73, eye creases 74, eyebrows 75, eye highlights 76, cheeks 77, and irises 78. Other features can include the head, eyeliners, eyelids, and eyelashes. The tools provided allow the user to reshape 81, move 82, zoom in/out 83, add/delete points 84, rotate 85, or erase 87 the default outlines. A brush 89 with a color palette 88, and an eyedropper 86 are also provided for painting, removing redeye, and selecting colors from the digital image for use with the brush 89.

Figure 5:
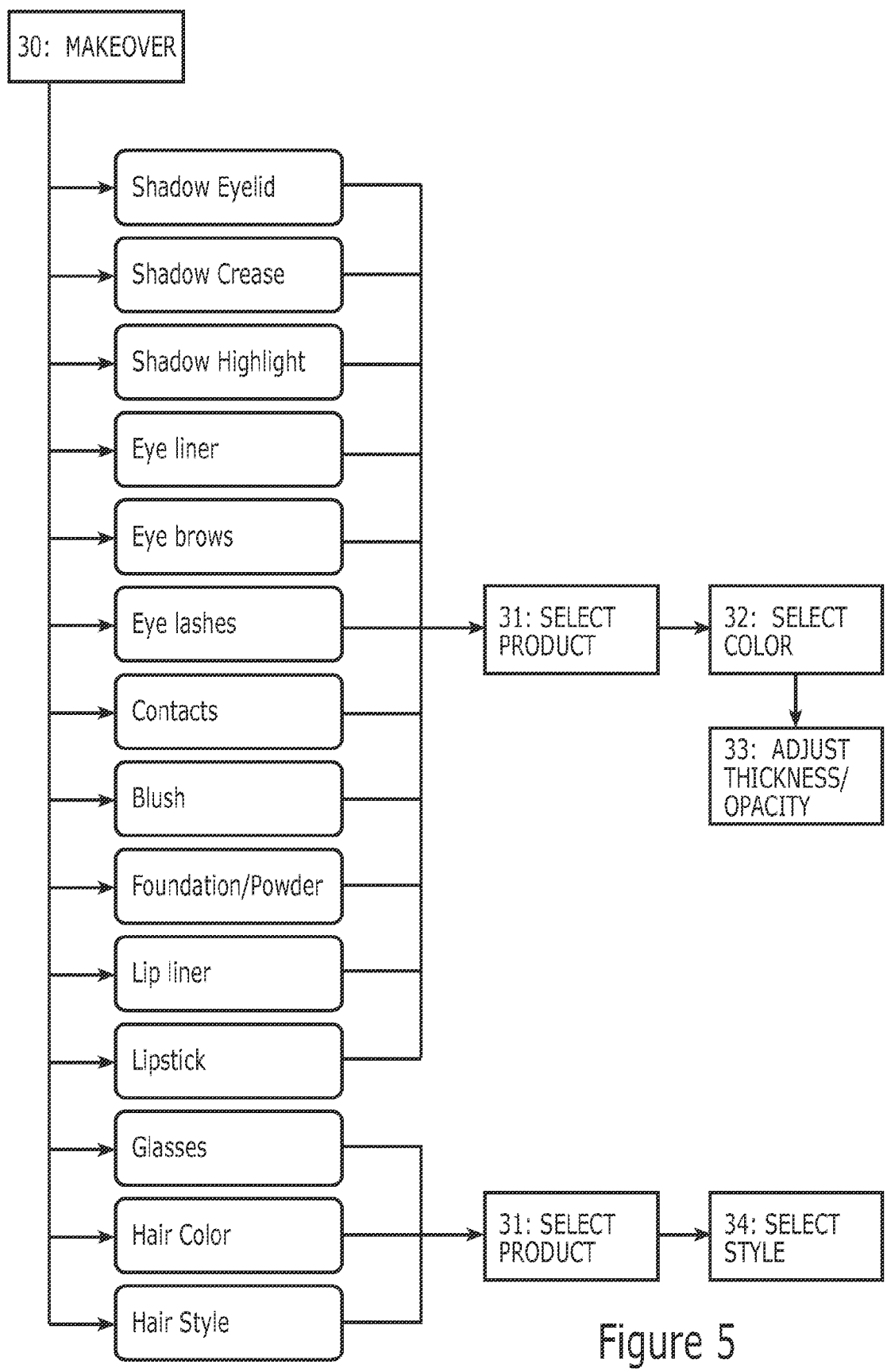
FIG. 5 is a diagram illustrating the general makeover process of the present invention.
Figure 6:
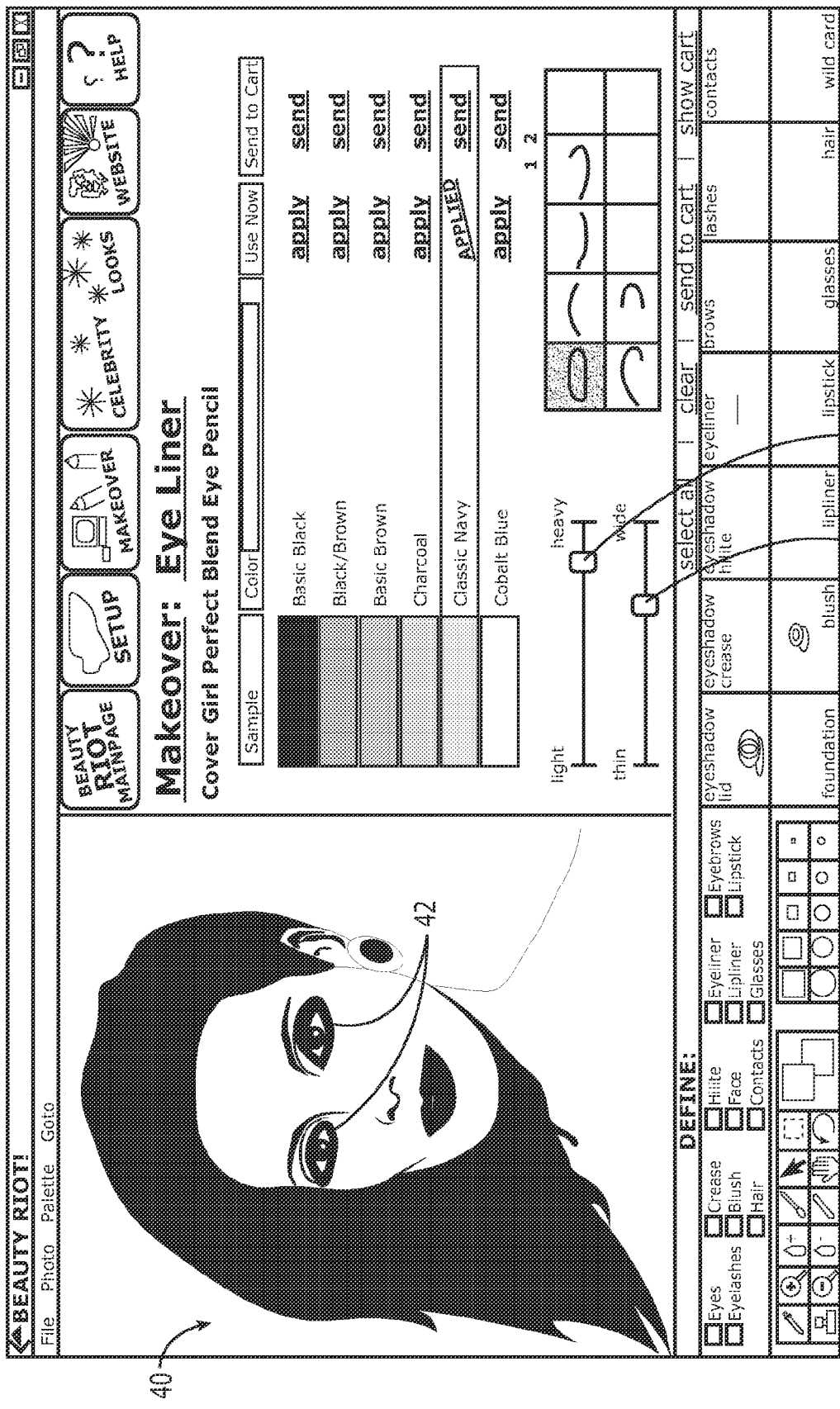
FIG. 6 illustrates the opacity and thickness controls which can be used in embodiments of the present invention.

Once the user has saved 24 the outlined features in connection with the photographic image, the user may then proceed to makeover the image. It is understood that the process of making over the image can be for purposes of virtual shopping and/or for education and entertainment. FIG. 5 illustrates the general makeover process 30. The user may choose from several options, including shadow the eyelid, shadow the eye crease, and shadow the highlight areas. Further, the user can choose to apply eyeliner, eye brow color, eyelashes, blush, foundation or powder, lip liner, and lipstick. The user can also opt to try on contacts, glasses and wigs. Once the user chooses an option, the user may select a product 31 from a list of products, typically identified by brand name and/or product number. Users may also search for a specific product. Each product may contain a description of the product, along with a picture, if available. All of the colors and/or styles of that product are then displayed to the user. The user may then choose a color 32 and/or style 34 to apply to one or more selected features. The altered photographic image is then displayed to the user with the selected product or products applied to the selected features. The user may, at any time during the makeover process, adjust the application of each product by selecting the desired thinness or thickness, or selecting the transparency of the applied product 33. By way of non-limiting example, FIG. 6 illustrates a photographic image 40 with eyeliner applied to the eyeliner features 42. The user may select the desired width of the eyeliner by sliding the width button 44 to the left or right thereby making the eyeliner thin or wide. The user may also adjust the opacity of the eyeliner by sliding the opacity button 46 to the left or right thereby making the applied eyeliner light or heavy. One having ordinary skill in the art will readily appreciate that other product application controls can be provided.

Figure 7:
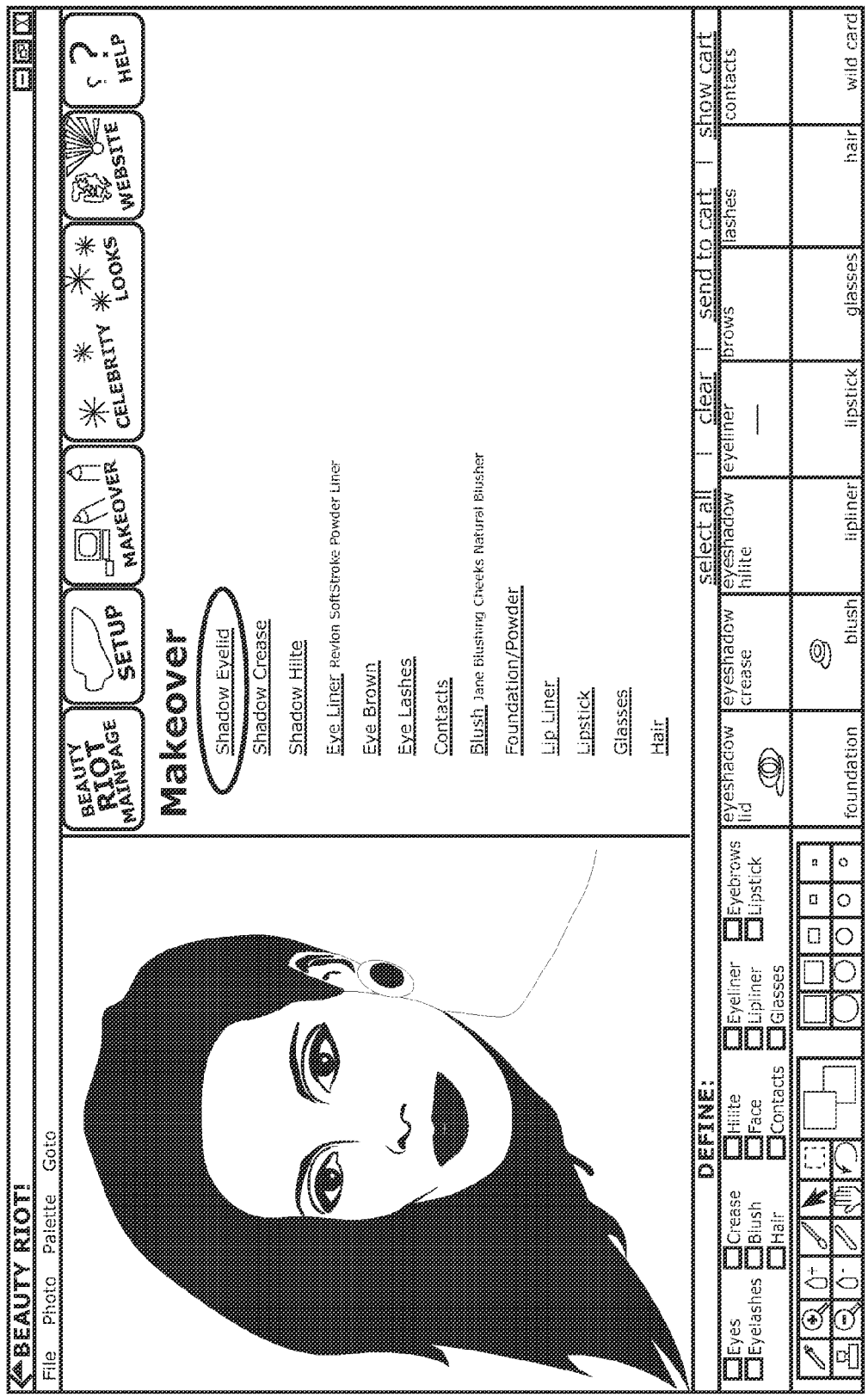
FIG. 7 illustrates the step of selecting a feature to makeover in accordance with the present invention.
Figure 8:
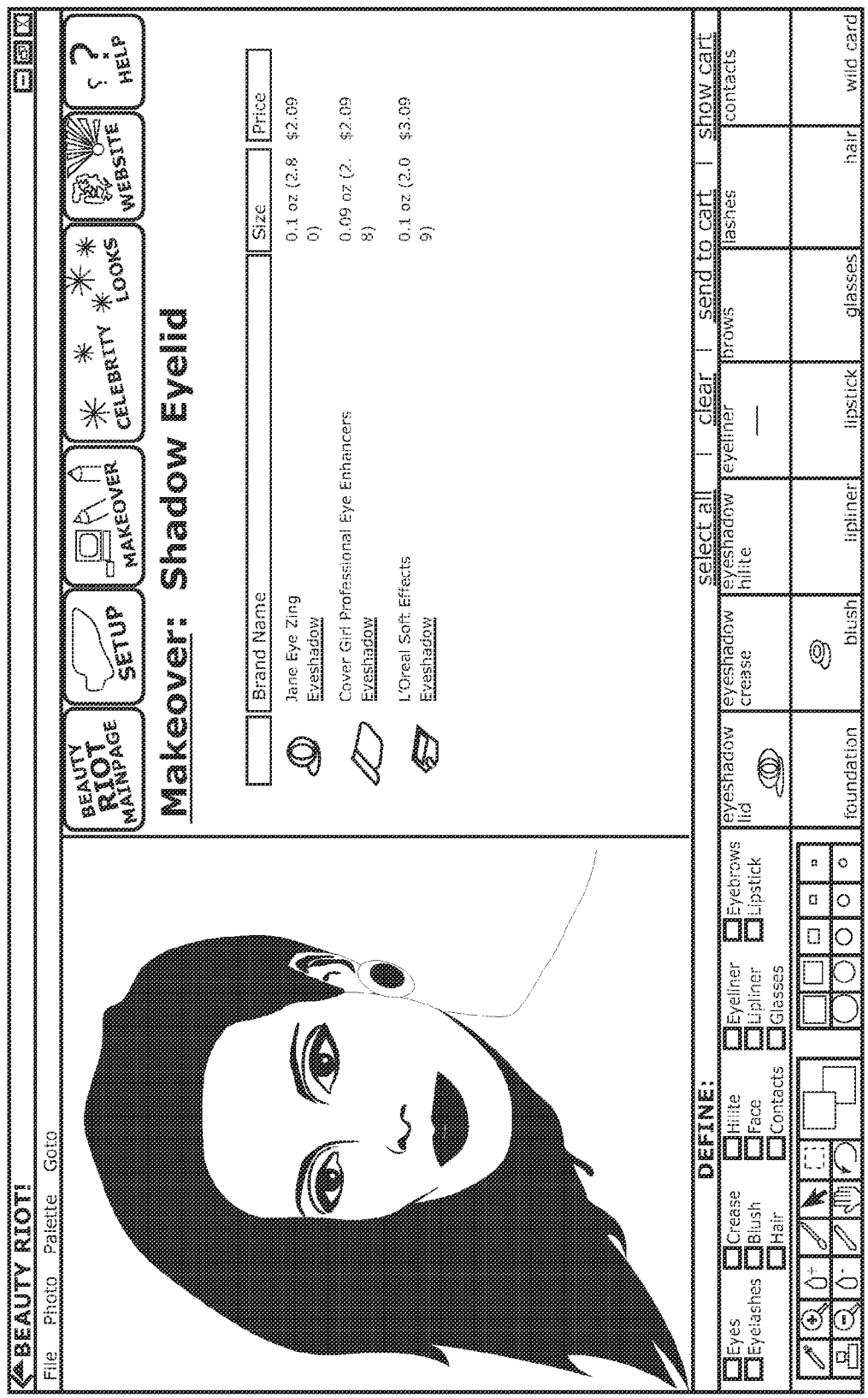
FIG. 8 illustrates the step of selecting a product for the feature selected in FIG. 7.
Figure 9:
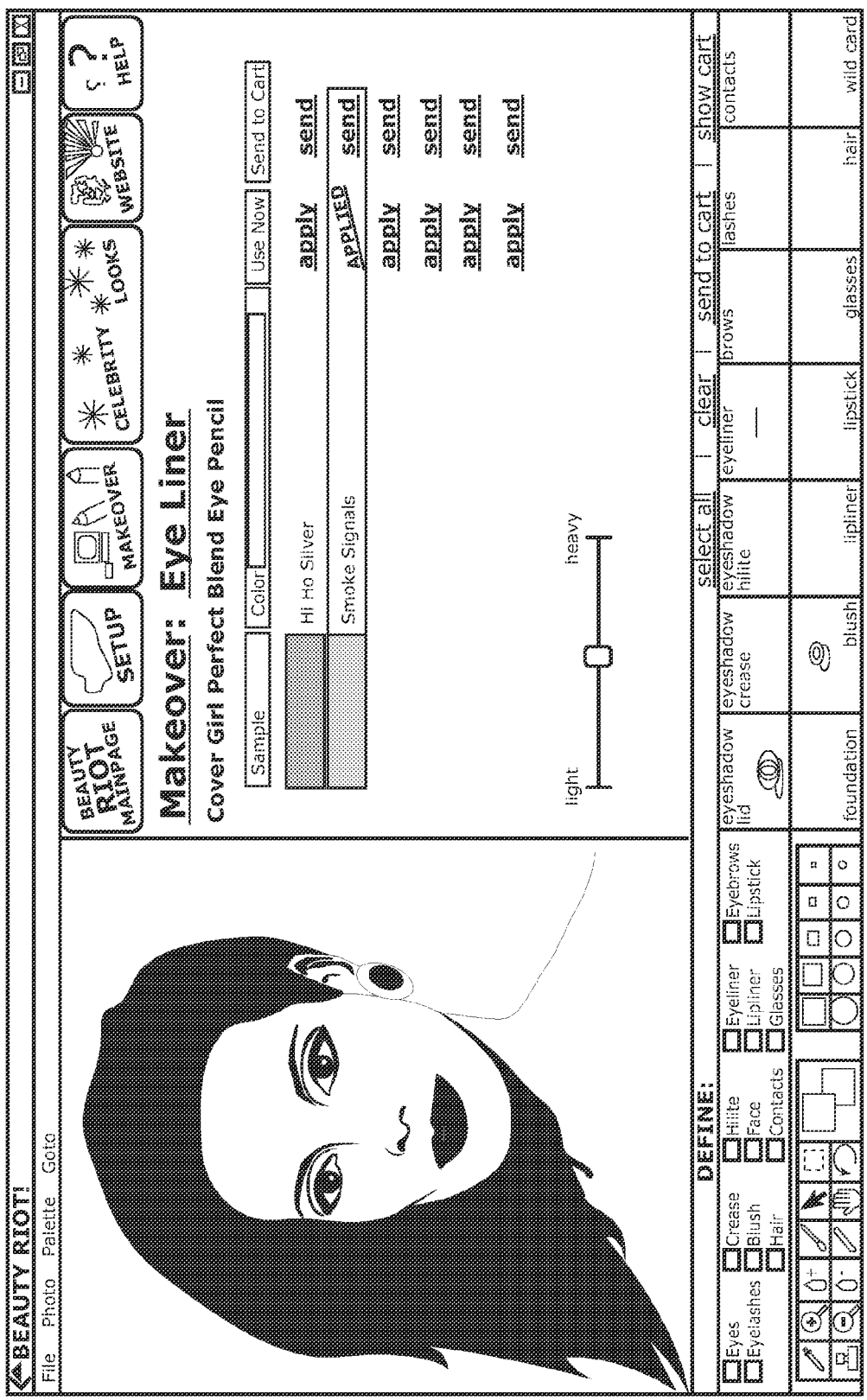
FIG. 9 illustrates the step of selecting a color or style to apply to the feature selected in FIG. 7.

By way of example, if a user selects to apply shadow to the eyelids (FIG. 7), a list of eye shadow products from the product database will be displayed to the user (FIG. 8). The user may then choose a product, and all the colors available for that product are displayed (FIG. 9). The user then selects a color, e.g. Hi Ho Silver, and the eye highlight outlined in the photographic image is colored with Hi Ho Silver. The user may than adjust the application of the eye shadow by selecting the desired opacity of the shadow using the opacity button 46. The eye shadow will be displayed in the photographic image as adjusted by the user.

Once the user has finished enhancing the image with beauty products, the enhanced image with the applied products can be saved on the system in the image database. The combination of products applied to the image can also be saved as a palette in the system's palette database. The palettes designed by a user can be saved, locally or on the system, and can be applied subsequently to other images, or sent to other users for application to images to be manipulated by such other users.

In a further embodiment of the present invention, users can experiment with and "try on" beauty products to determine what colors, shapes, and styles accentuate the natural features in ones face, such as the shape of the eyes, cheeks, and nose. The colors used by the system are designed to represent the true color of the product, thus enabling the user to virtually view the product as it would appear on the user's face.

In another embodiment, pre-set photographic images can be provided to the user. Pre-set images are setup, and thus do not require the user to outline features in the image. Users can, for example, select a photograph of a celebrity from the image database and apply selected beauty products to the celebrity photograph. Users can also apply previously saved palettes and pre-configured palettes to the celebrity photographs. In another embodiment, users can select a pre-configured image, wherein a palette is applied to the image. Users can use the palette used on the pre-configured image to "achieve the same look" by applying the same beauty products to the user's own photograph, or to other user-related photographs.

While the present invention has been described herein with reference to particular embodiments thereof, a latitude of modification, various changes, and substitutions are intended in the foregoing disclosure. For instance, the present invention also empowers users to obtain pre-set palettes used by celebrities. Other types of beauty products can also be included, such as earrings and other accessories. Thus, it will be appreciated that in some instances some features of the invention may be employed without corresponding use of other features.

One of ordinary skill in the art will know, or be able to ascertain, using no more than routine experimentation, many equivalents to the specific embodiments of the invention described herein. These and all other equivalents are intended to be encompassed by the following claims. All publications and references cited herein are expressly incorporated herein by reference in their entirety.

The invention claimed is:

1. A makeover method, such method comprising the steps of:
    configuring a computer to receive a facial image;
    positioning a plurality of adjustable shapes on the facial image, each adjustable shape comprising a plurality of lines connected by a plurality of points;
    enabling a user to adjust the points on the plurality of templates to outline features on the facial image;
    providing a catalog of beauty products;
    enabling the user to specify beauty products to apply to the outlined features; and
    displaying a made over facial image having the specified beauty products applied to the outlined features, thereby enabling the user to visualize an intended makeover.

2. The method of claim 1, wherein the modified facial image shows the applied products in true color.

3. The method of claim 1, wherein the facial image is an image of the user.

4. The method of claim 1, further comprising the step of storing the specified particular products as a palette for application to other or later images.

5. The method of claim 1, further comprising the step of storing the specified particular products in a shopping cart, and enabling the user to purchase the items in the shopping cart.

6. A method for outlining features in a digital photographic image, comprising:
    receiving a digital photographic image from a user;
    providing a plurality of pre-configured adjustable shapes for outlining features in the digital photographic image, each adjustable shape comprising a plurality of lines connected by a plurality of points which together form the shape;

enabling the user to select a point on the adjustable shape;

enabling the user to move each selected point to outline a specific feature in the digital photographic image and thereby moving each line connected to the point moved by the user so as to form a new shape;

displaying each new shaped formed by the user in connection with the outlined features in the photographic image;

enabling the user to save each new shape in connection with the photographic image providing a product database of beauty products available for purchase, each beauty product being computer manipulatable by the user such that specific beauty products can be applied to and displayed in connection with the outlined features of the photograph image;

enabling the user to access the product database to apply beauty products to the outlined features of the photographic image; and enabling the user to select from the product database one or more beauty products available for purchase and to apply an image representative of the one or more products available for purchase in the photographic image.

7. The method of claim 6, further comprising:

enabling the user adjust the application of the beauty product to the photographic image.

8. The method of claim 7, wherein the step of enabling the user to adjust the application of the beauty product to the photographic image comprises:

enabling the user to select a desired width or opacity of the applied beauty product.

9. The method of claim 6, wherein the beauty products are selected from the group consisting of wigs, glasses, contacts, eye shadow, blush, eye liner, lipstick, lip liner, foundation, eye brow color, eye lashes, hair color, and combinations thereof.

10. The method of claim 6, further comprising:

enabling the user to search for a specific beauty product in the product database.

11. The method of claim 6, further comprising:

enabling the user to save the selected beauty products as a palette.

12. The method of claim 11, further comprising:

enabling the user to communicate the palette to other users.

* * * * *